United States Patent [19]

Pera

[11] Patent Number: 4,936,256
[45] Date of Patent: Jun. 26, 1990

[54] MILKING MACHINE

[75] Inventor: Anne Pera, Emmeloord, Netherlands

[73] Assignee: Gascoigne-Melotte B.V., Emmeloord, Netherlands

[21] Appl. No.: 229,015

[22] Filed: Aug. 5, 1988

[30] Foreign Application Priority Data

Aug. 5, 1987 [NL] Netherlands .................. 8701848

[51] Int. Cl.$^5$ .............................................. A01J 5/04
[52] U.S. Cl. ................................. 119/14.08; 119/14.1
[58] Field of Search ............... 119/14.08, 14.09, 14.1, 119/14.11

[56] References Cited

U.S. PATENT DOCUMENTS

| 927,896 | 7/1909 | Story | 119/14.1 X |
| 3,624,739 | 11/1971 | Thomas | 119/14.1 |
| 4,010,714 | 3/1977 | Notsuki et al. | 119/14.03 |
| 4,805,557 | 2/1989 | van der Lely et al. | 119/14.08 |

FOREIGN PATENT DOCUMENTS

| 194729 | 9/1986 | European Pat. Off. |
| 0213660 | 3/1987 | European Pat. Off. |
| 0229682 | 7/1987 | European Pat. Off. |
| 2408300 | 6/1979 | France |
| 2595197 | 9/1987 | France |
| 8502973 | 7/1985 | World Int. Prop. O. |

Primary Examiner—Robert P. Swiatek
Attorney, Agent, or Firm—Buchanan Ingersoll; Michael L. Dever

[57] ABSTRACT

Machine for milking animals, comprising a mobile carrier for taking a number of teat cups under an udder, the common carrier being a narrow oblong element carried by a supporting structure supported on the fixed surrounding area, and bearing on both sides one or more carriages which are movable along it independently of each other, each carriage carrying a teat cup and being able to move the teat cup from and to the carrier and up and down. Preferably the common carrier is connected to the supporting structure for a pivoting movement about an approximately horizontal axis at right angles to the lengthwise direction of the carrier, and each teat cup is approximately vertically movable with a holder in its carriage by a driver which exerts an elastic upward force thereon.

17 Claims, 2 Drawing Sheets

MILKING MACHINE

The invention relates to a machine for milking animals, comprising a mobile carrier for taking a number of teat cups under an udder and means for moving one or more teat cups carried by said carrier relative thereto in two approximately horizontal directions, approximately at right angles to each other.

Such machines are known from International Patent Application No. 85/02973, NL 84.00044, and from U.S. Patent Specification No. 4,010,714. In the former publication the individual teat cups are supported resiliently in a slide which can move in one horizontal direction through being supported by another slide which can move in a horizontal direction at right angles to the said direction on said common carrier, so that the teat cups can be adjusted in two directions at right angles to each other, for example under the influence of a computer memory containing data on the teat positions of each individual animal to be milked. The common carrier can pivot freely about a horizontal axis at right angles to the lengthwise direction of the animal, and can be held pressed upwards with a constant force while the teat cups are connected. The teat cups have wide top parts also holding the bottom part of the udder.

Such a milking machine is known for U.S. Patent Specification No. 4,010,714, in which the teat cups can also be adjusted on a common carrier in two approximately horizontal directions, at right angles to each other under the control of a computer memory, while they can be moved upwards until sensing switches establish that their top edges are making contact with the udder. Two pulse motors for each teat cup, operating in directions at right angles to each other, shift a block holding the teat cup relative to said common carrier.

While the milking machine forms the first-mentioned publication pivots from the rear end of the animal between the hind legs through to below the udder, in the latter-mentioned publication the milking machine can be moved in its entirety from the floor at an angle upwards to the udder.

The object of the invention is to improve such known designs, particularly in construction, in such a way that with a relatively simple constuction which takes up littel space and is easy to inspect and repair, optimum adaptation of the position of the teat cups to each individual animal is easily possible.

For this, a milking machine of the type referred to in the preamble is according to the invention characterized in that the common carrier is a narrow oblong element carried by a supporting structure supported on the fixed surrounding area, with its lengthwise direction in the lengthwise direction of and in the lengthwise centre of the animal to be milked, said carrier bears on both sides one or more carriages which are movably guided by said carrier in its lengthwise direction and are movable along it independently of each other, each of said carriages carrying a teat cup and having means for moving said teat cup in the carriage from and to the carrier and up and down.

This produces a milking machine which takes up very little space in the lateral direction and is thus especially suitanle for being attached and removed between the hind legs of the animal through, a milking machine which despite its relatively light weight can be of sturdy construction, is easy to clean, inspect and, if necessary repair, and which is not easily damaged, partly because the parts susceptible to damage be placed in a well-protected part of the structure.

The invention will now be explained in greater detail with reference to the attached drawings of a preferred embodiment of a milking machine according to the invention. In the drawings.

Figure 1:
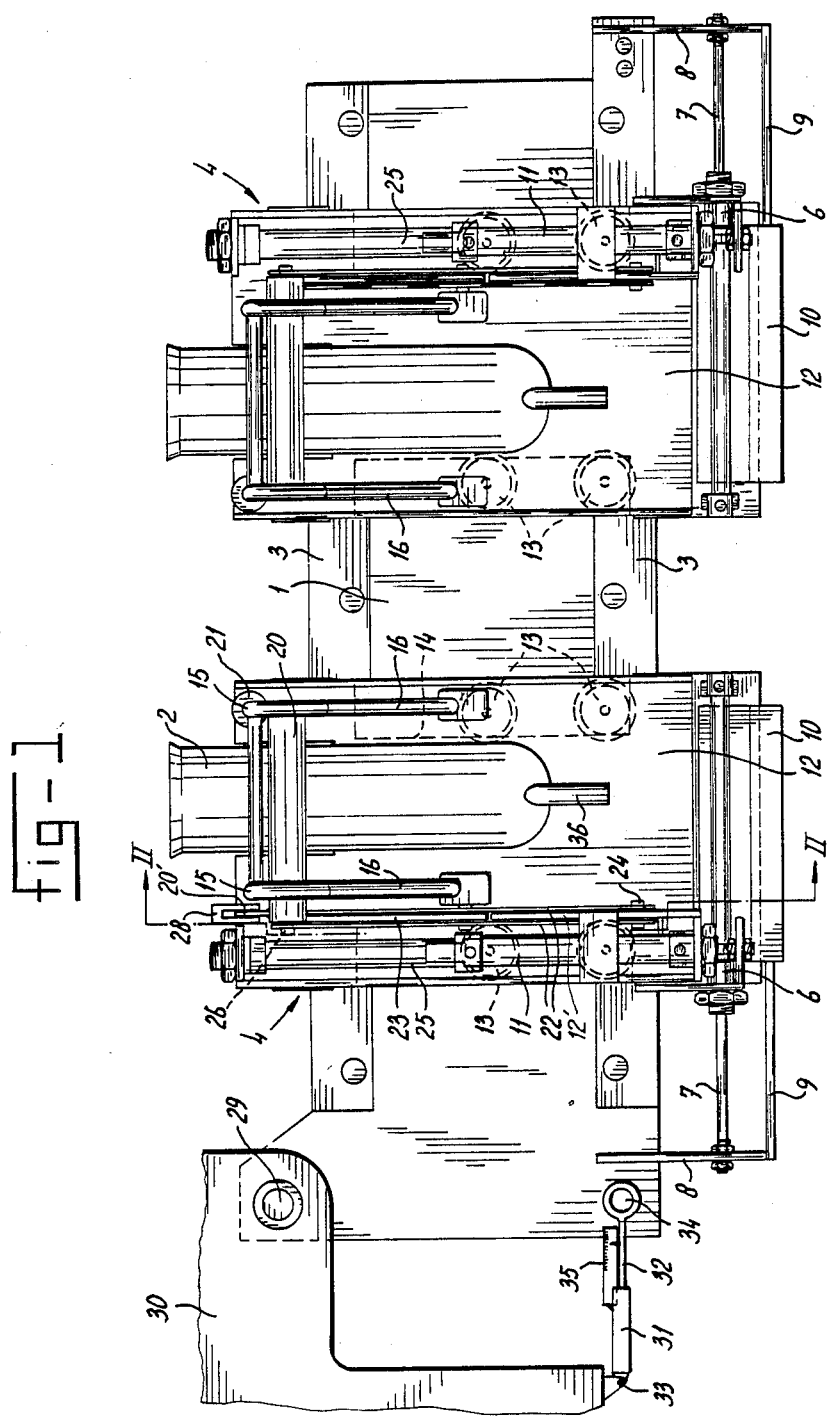
FIG. 1 shows a side view of such a milking machine.

A common carrier 1 for the teat cups 2 is designed as a veertical long plate having on the top and bottom end two upright strips 3 projecting upwards and downwards from the plate. Two carriages 4 with slide blocks 5, for example made of a plastic material with a low coefficient of friction, engage beside each other on the top and bottom strip 3 at each side of the plate. Instead of this, the carriages 4 could travel over the strips 3 with rollers. Each carriage 4 bears at its bottom end a horizontal double-acting pneumatic cylinder 6 having a supply and discharge line (not shown), and having a piston rod 7 which is fixed to an arm 8 on the carrier 1. A fixed rod 9 on said carrier 1 runs parallel to said piston rod 7 and engages in the lengthwise direcon in relatively mobile fashion in a box 10 on the carriage. Said parts 9 and 10 carry position-determining means (not shown), for example a number of LEDs on one of said parts (normally on box 10) and a photosensor on the other part, with electrical cables (not shown), all this in order to determine in a manner which is known per se the position of each carriage 4 along the carrier 1 and to stop the movement of the carriage when it has reached a position on the carrier determined by a computer.

Figure 2:
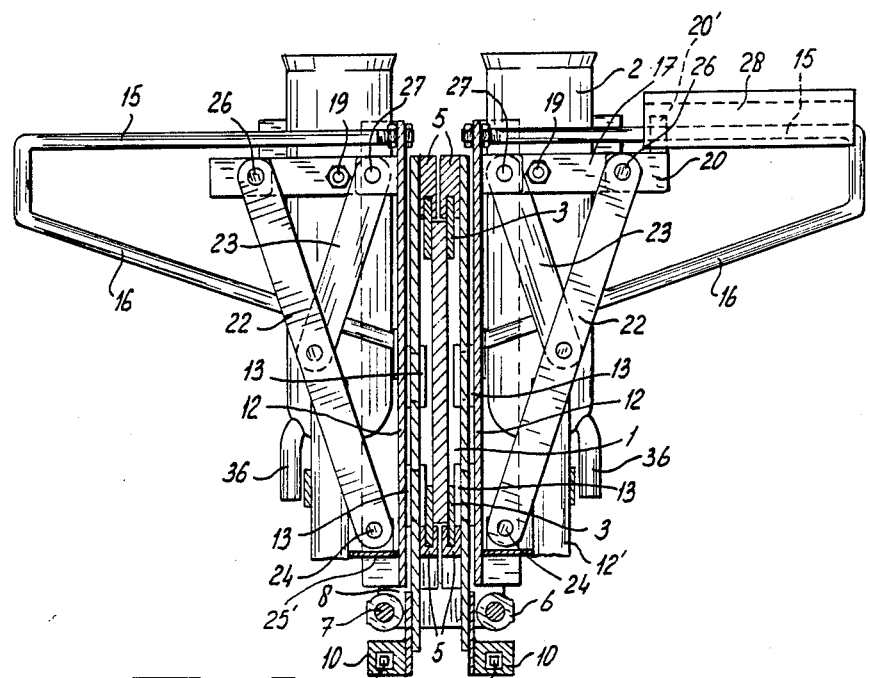
FIG. 2 shows a partial cross section and a view along the line II—II in FIG. 1.

An upright pneumatic cylinder 11 is disposed on each carriage 4, and a vertically movable part thereof (the cylinder or the piston rod as desired) is fixed on a lifting plate 2 which is movable vertically relative to the carriage. Said plate has a welded-on vertical cross plate 12'. The lifting plate 12 can be guided up and down relative to the carriage by means of rollers 13 which are disposed on the arm and which engage with flanges round inwardly displaced side edges 14 of the carriage, for example two rollers 13 on each side of each carriage. The flanges of the rollers 13 can be seen in FIG. 2. The cylinders 11 are designed and fed in such a way that they can move their lifting plate 12 up with an elastic force, i.e. said movement stops when the teat cup 2 carried by the lifting plate meets with a certain settable resistance from the udder and/or teat of the cow, the pressure in the cylinder 11 in question being held at that value during milking.

Figure 3:
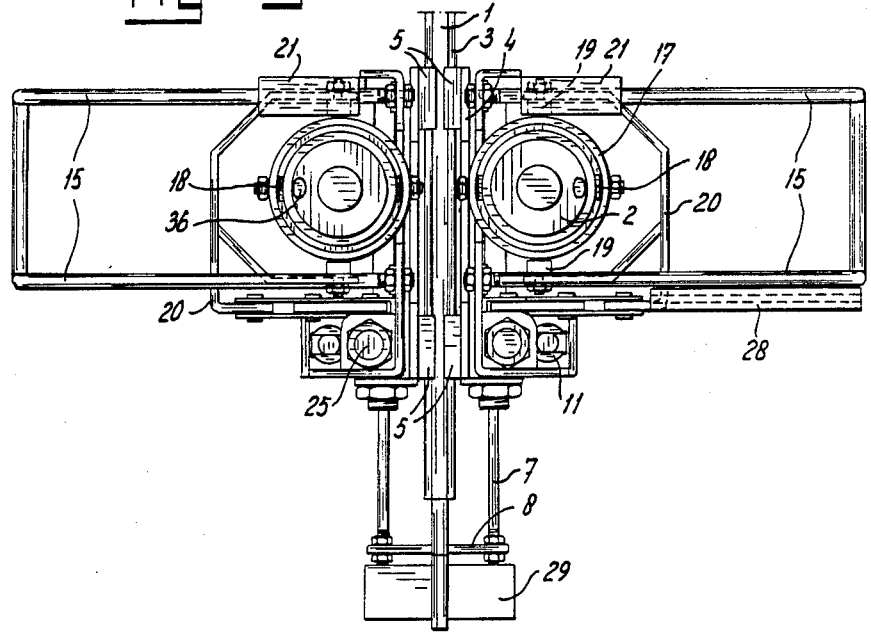
FIG. 3 shows partial top view thereof.

Each lifting plate 12 has two parallel horizontal bars 15, projecting at right angles from the carrier 1 and supported by slanting struts 16. Each teat cup 2 hangs in a Cardan ring 17 with a horizontal hinge pin 18 between cup and ring and a horizontal hinge pin 19 between said ring and a carrier 20, with a relatively long slide bush 21 slidingly supported on one of the bars 15, or two shorter slide bushes 21, one on each of the bars 15. A bar link system 22, 23 is hingedly connected by the bottom end 24 of the double long bar 22 to the moving part of a vertical pneumatic cylinder 25 accommodated in the lifting plate, and by the top end of said bar 22 to the carrier 20 at 26. The cylinder 25 is next to the cylinder 11 carried by the carriage and has at the bottom end of its moving part a slide block 25' which is guided in a vertical groove between the vertical main face of lifting plate 12 and the cross plate 12' thereon. The short bar 23 is hingedly connected at one side to a point near the centre of bar 22 (engaging between the two bars 22) and at the other to a fixed point 27 on the lifting plate. The cross plate 12' on arm 12 forms a lateral guide for and between the two bars 22 (FIG. 1). When the moving part of the cylinder 25 is moved up by pneumatic medium, point 24 moves up so that bar 22 and bar 23 pivot in such a way that point 26 moves away from the carrier 1 outward. The carrier 20 thereby moves sideways with the Cardan ring 17 and the teat cup 2, while the bush 21 slides along the bar 15. For this movement too, provision is made for a distance measuring and indicator system, for example with LEDs and a photosensor movable along them, all these being as known per se, and being only shown schematically here at the top lefthand side of FIG. 1 and on the righthand side of FIGS. 2 and 3, as a box 28, in which an upright part 20' on the carrier 20 engages and slides therein.

The upright carrier 1 is hingedly supported at 29 (FIG. 1) by a supporting structure 30, which is not shown in further detail, and which can, for example in a manner such as that indicated in the above-mentioned International Patent Application No. 85/02973, take said carrier forward from the rear end of an animal for milking between the hind legs through to below the udder, and can move it up and down to connect and remove the milking machine. In the above-mentioned application the carrier hangs with the teat cups pivoting freely about a horizontal transverse shaft near the centre in a supporting structure. Since in the case of many animals for milking the front and rear teats are set at very differing levels in the udder, it is now proposed that the carrier 1 should not be left to seek its own position through the resistance met with from teats and udder, but that the data on the difference in height between the front and rear teats of a particular animal should also be stored in a computer memory together with other data on the teat positions and the individual milking behaviour thereof, so that on recognition of a particular animal through an identification means worn by it, not only are the carriages and arms taken into the correct horizontal positions for that animal, as described, but the carrier 1 is also turned in a position adapted to that animal about hinge pin 29 to take up either a horizontal position or a position differing from that. For this purpose a pneumatic cylinder 31 with piston rod 32 is provided between the supporting structure 30 and the carrier 1, at a distance from hinge pin 29, and pivoting at 33 and 34. For the sake of simplicity, it is made short and small in FIG. 1. Here again there is a position measuring and setting device 35 between the moving parts, for example again with LEDs and a photosensor. The supporting structure 30, although movable until it is below the animal and up and down relative thereto, is always held in the same angular position in a vertical plane by means of a parallel construction not shown, so that the change in the length of cylinder 31 and piston rod 32 is a direct measure of the angular position of carrier 1 relative to the horizontal.

The teat cups 2 can be designed in any desired way, and in the usual manner are provided with flexible linings, a connection 36 for pulsating pressure between rigid casing and lining, a milk discharge line etc., which need not be shown in further detail here.

Through use of the invention therefore, each teat cup can be taken quickly to the correct position for each animal for milking, in two horizontal directions at right angles to each other, the positions being determined and fed from a computer memory after recognition of the animal to be mixed, while the carrier 1 can be taken into the desired horizontal position, or a position differing therefrom, and the teat cups are held individually by an elastic upward pressure during milking.

I claim:
1. An apparatus for milking animals comprising a narrow oblong carrier provided on a supporting structure, wherein the carrier is connected to said supporting structure such that said carrier pivots about an approximately horizontal axis at right angles to the lengthwise direction of the carrier, said carrier adapted to be positioned under an animal to be milked, said carrier positioned with its lengthwise direction in the lengthwise direction and in the lengthwise center of the animal to be milked, at least two carriages, at least one of said carriages provided on each side of said carrier, said carriages movably guided by said carrier in its lengthwise direction and independently movable along said carrier, a teat cup provided on each carriage, means for moving each teat cup on the carriage from and to the carrier and up and down and a tilting mechanism disposed between said carrier and said supporting structure to move said carrier in an angular position in and out of the horizontal position and to retain said carrier in any desired position.

2. Apparatus according to claim 1 further comprising a holder provided on each carriage for holding said teat cup, and drive means provided on each carriage to exert an elastic upward force on said holder to move said teat cup in an approximately vertical direction, such that when said upward movement of said drive means stops, an upward force of said drive means continues to act elastically when said teat cup meets with a certain downward reaction force from the teat or from the udder of said animal.

3. An apparatus according to claim 2 further comprising an arm supported on said carriage, and in turn supporting said holder if said teat cup, said arm adapted to move said teat cup from and to said carrier, said arm adapted to move approxiamtely vertical relative to said carriage to bring about said vertical movement of said teat cup holder.

4. Machine according to claim 3 wherein the teat cup holder has a Cardan ring structure, by means of which it carries its teat cup so that it can be swiveled on all sides.

5. Machine according to claim 3 wherein said carriage carries two approximately vertical linear motors, one of said linear motors handling the vertical movement of said teat cup holder, a second of said linear motors moving said teat cup holder relative to said carriage approximately horizontally at right angels to said carrier.

6. Machine according to claim 5 wherein at least one of said vertical linear motors is a pneumatic cylinder.

7. An apparatus according to claim 5 wherein said two linear motors lie approximately in the same vertical plane at right angles to the direction of movement of said carriage.

8. Apparatus according to claim 2 wherein the teat cup holder has a Cardan ring structure by means of which it carries its teat cup so that it can be swivelled on all sides.

9. Machine according to claim 8 wherein said carriage carries two approximately vertical linear motors, one of said linear motors handling the vertical movement of said teat cup holder, a second of said linear motors moving said teat cup holder relative to said carriage approximately horizontally at right angles to said carrier.

10. Machine according to claim 9 wherein at least one of said vertical linear motors is a pneumatic cylinder.

11. An apparatus according to claim 9 wherein said two linear motors lie approximately in the same vertical plane at right angles to the direction of movement of said carriage.

12. Machine according to claim 2 wherein said carriage carries two approximately vertical linear motors, one of said linear motors handling the vertical movement of said teat cup holder, a second of said linear motors moving said teat cup holder relative to said carriage approximately horizontally at right angles to said carrier.

13. Machine according to claim 12 wherein at least one of said vertical linear motors is a pneumatic cylinder.

14. An apparatus according to claim 12 wherein said two linear motors lie approximately in the same vertical plane at right anngles to the direction of movement of said carriage.

15. Apparatus according to claim 2 further comprising at least one of distance and angle control elements provided near or on said tilting mechanism between said carrier and said supporting structure, said distance and angle control elements adapted to stop a tilting movement of said carrier under computer control when a correct tilted position for qa particular said animal for milking is reached.

16. Apparatus according to claim 1 wherein remote control elements are disposed between said carrier and said carriages and between said teat cup holders and said carriages, in order to determine the movement of each said carriage along said carrier and of each said teat cup holder in its carriage at right angles to said carrier and to stop said carriage and said teat cup holder under computer control when said carriage and said teat cup holder reach a correct position, so that each said teat cup is placed in a correct position in two horizontal directions at right angles to each other suitable for a particular said animal for milking.

17. Apparatus according tp claim 16 further comprising at least one of distance and angle control elements provided near or on said tilting mechanism between said carrier and said supporting structure, said distance and angle control elements adapted to stop a tilting movement of said carrier under computer control when a correct tilted position for a particular said animal for milking is reached.

* * * * *

UNITED STATES PATENT AND TRADEMARK OFFICE
CERTIFICATE OF CORRECTION

PATENT NO. : 4,936,256

DATED : June 26, 1990

INVENTOR(S) : ANNE PERA

It is certified that error appears in the above-identified patent and that said Letters Patent is hereby corrected as shown below:

Column 2, line 12, change "veertical" to --vertical--.

Column 2, line 38, change "2" to --12--.

Column 4, line 3, change "mixed" to --milked--.

Column 4, line 40, claim 3, change "if" to --of--.

Column 6, line 4, change "qa" to --a--.

Signed and Sealed this

Twenty-fifth Day of June, 1991

Attest:

HARRY F. MANBECK, JR.

Attesting Officer

Commissioner of Patents and Trademarks